United States Patent [19]

Batzill et al.

[11] Patent Number: 4,496,672

[45] Date of Patent: Jan. 29, 1985

[54] PROCESS FOR COATING AN ELECTRICALLY CONDUCTIVE SUBSTRATE

[75] Inventors: Wolfgang Batzill, Münster; Horst Diefenbach, Nottuln, both of Fed. Rep. of Germany

[73] Assignee: BASF Farben & Fasern A.G., Hamburg, Fed. Rep. of Germany

[21] Appl. No.: 413,145

[22] Filed: Aug. 30, 1982

Related U.S. Application Data

[62] Division of Ser. No. 320,504, Nov. 12, 1981, Pat. No. 4,416,753.

[30] Foreign Application Priority Data

Nov. 26, 1980 [DE] Fed. Rep. of Germany ....... 3044447

[51] Int. Cl.$^3$ ............................................. C08L 63/00
[52] U.S. Cl. .................................................... 523/404
[58] Field of Search ........................................ 523/404

[56] References Cited

U.S. PATENT DOCUMENTS

| | | | |
|---|---|---|---|
| 4,116,900 | 9/1978 | Belanger | 523/404 |
| 4,238,385 | 12/1980 | Okado et al. | 204/181 C |
| 4,252,703 | 2/1981 | Patzchke et al. | 523/404 |

Primary Examiner—Paul R. Michl
Assistant Examiner—Alex H. Walker
Attorney, Agent, or Firm—Wells & Wells

[57] ABSTRACT

A process for coating an electrically conductive substrate, connected as the cathode, with a cationic coating agent from an electrocoating bath and subsequently hardening the coating, is characterized in that an aqueous dispersion made from:

A. cationic, synthetic resins which have been protonated with acids, contain basic groups and are in a dissolved or dispersed form and B. dispersed, finely divided, ionic plastics is used as the cationic coating agent.

10 Claims, No Drawings

PROCESS FOR COATING AN ELECTRICALLY CONDUCTIVE SUBSTRATE

This is a division of application Ser. No. 320,504, filed Nov. 12, 1981, which is now U.S. Pat. No. 4,416,753.

The invention relates to a process for coating an electrically conductive substrate, connected as the cathode, with a cationic coating agent from an electrocoating bath and subsequently hardening the coating. The invention also relates to the coating agent for carrying out the coating process.

West German Published Application No. 2,248,836 discloses a process in which coatings are deposited onto the cathode in an electrocoating bath, which contains a cationic resin together with a pulverulent, nonionic, synthetic resin. One of the disadvantages of the known electrocoating baths is that they are unstable and segregate by precipitating the pulverulent contents. If, for example, stirring equipment fails, these electrocoating baths are frequently almost impossible to re-stir later on.

A further disadvantage of the known coating agents is that uneven coatings are obtained on differently pretreated substrates. Remote parts are also coated less well. Different film thicknesses are obtained on substrates with horizontal and vertical areas.

It is therefore the object of the invention to provide improved electrocoating baths, avoiding these disadvantages.

This object is surprisingly achieved by a process for coating an electrically conductive substrate, connected as the cathode, with a cationic coating agent from an electrocoating bath and subsequently hardening the coating, wherein an aqueous dispersion made from:
 A. cationic, synthetic resins which have been protonated with acids, contain basic groups and are in a dissolved or dispersed form and
 B. dispersed, finely divided, ionic plastics is used as the cationic coating agent.

Aqueous dispersions which are preferentially suitable are those containing pigments and/or fillers and/or those water-miscible organic solvents which do not either incipiently dissolve or incipiently swell the finely divided plastics.

In a particularly preferred embodiment of the invention, the finely divided ionic plastics can themselves contain pigments and/or fillers.

Not only the finely divided, ionic plastics but also the cationic synthetic resins can be cathodically deposited evenly from the aqueous dispersions according to the invention, and they produce, after a brief coating time, coatings of up to 150 μm which have, after stoving, outstanding mechanical properties, such as high hardness and scratch resistance together with good elasticity and firm adhesion to the substrate.

After stoving at temperatures of up to 200° C., for a stoving time of about 15 minutes, the coatings have exceptionally good corrosion resistance. Values of up to 1,000 hours are achieved in the salt spray test as specified in German Industrial Standard DIN 50,021.

It has also been found that the surface of the stoved coating is so smooth that a single top layer of lacquer is sufficient to achieve a lacquer coating with a good appearance.

The coating agent is distinguished by a very good bath stability and long shelf life.

The aqueous dispersions used in the process according to the invention make it possible for any electrically conductive metallic workpieces, preferably workpieces from ferrous metals, to be coated. The workpieces to be coated are immersed in an electrocoating bath and connected as the cathode.

The cationic synthetic resin which contains basic groups is present in the aqueous dispersion in a protonated form and serves as a carrier resin for the component B. It will be designated "carrier resin" in the text which follows. The carrier resin is protonated with suitable inorganic and/or organic acids, preferably water-soluble carboxylic acids, and, in the protonated form, it is soluble or dispersible in water or can be mixed and diluted with water. The pH value of the aqueous dispersion can be adjusted to a value between 1 and 9.

Suitable acids are virtually all known inorganic and organic acids, such as, for example, hydrochloric acid, sulfuric acid, phosphoric acid, carbonic acid, p-toluenesulfonic acid, acetic acid, propionic acid, formic acid, citric acid, lactic acid, malic acid, fumaric acid, maleic acid and phthalic acid and also the half-esters of fumaric acid, maleic acid and phthalic acid with monohydric or polyhydric aliphatic alcohols, such as methanol, ethanol, propanol or ethylene glycol. The best results are obtained using acetic acid, lactic acid and formic acid, which are therefore proposed as preferentially suitable protonating agents.

The carrier resin is preferably used in coating agents for the cathodic electrocoating lacquering of electrically conductive substrates, for example metal parts made of aluminum, brass, copper, iron, steel and alloys of iron with other metals, which may have been pretreated chemically, for example phosphatized.

The aqueous dispersion used in the process according to the invention contains as component A cationic synthetic resins containing basic groups. Products from the reaction of a resin which contains epoxide groups with primary and/or secondary amines or products from the reaction of a resin which contains epoxide groups with Mannich bases which are free from epoxide groups are preferentially suitable. This synthetic resin, together with the component B, forms an aqueous dispersion stable at room temperature.

Any monomeric or polymeric compound or a mixture of such compounds which on average contains one or more epoxide groups per molecule can be used as the resin which contains epoxide groups. Polyepoxide compounds having 2 to 3 epoxide groups per molecule are preferred. Polyglycidyl ethers of polyphenols, such as of bisphenol A, are a particularly highly suitable class of polyepoxides. These ethers are obtained, for example, by etherifying a polyphenol by means of epichlorohydrin or dichlorohydrin in the presence of alkali. Examples of a phenolic compound for these polyepoxides are bis-(4-hydroxyphenyl)-2,2-propane, 4,4'-dihydroxybenzophenol, bis-(4-hydroxyphenyl)-1,1-ethane, bis-(4-hydroxyphenyl)-1,1-isobutane, bis-(4-hydroxy-tert.-butylphenyl)-2,2-propane, bis-(2-hydroxynaphthyl)-methane and 1,5-dihydroxynaphthalene. In many cases it is advantageous to use polyepoxides which have somewhat higher molecular weights and aromatic groups. They are obtained by reacting the diglycidyl ether with a polyphenol, such as bisphenol A, and thereafter reacting this product further with epichlorohydrin to give a polyglycidyl ether. The polyglycidyl ether obtained from polyphenols preferably contains free hydroxyl groups in addition to the epoxide groups.

The polyglycidyl ethers of polyphenols can be used as such, but it is frequently advantageous to react some of the reactive positions (hydroxyl groups or in many cases epoxide groups) with a modifying material, which modifies the film properties of the resin. Well known candidates for such a reaction are an esterification using carboxylic acids, in particular fatty acids, and/or an etherification using mono-alcohols or polyalcohols. Saturated fatty acids and in particular pelargonic acid are particularly suitable carboxylic acids.

Ethylene glycol, propylene glycol, butane-1,2-diol, hexane-1,4-diol, neopentyl glycol, dimethylolcyclohexane and perhydrobisphenol A, and also polyesters, such as, for example, preferably linear polyesters having terminal OH groups, are suitable polyalcohols. The epoxide resins can also be modified with organic materials which contain isocyanate groups or with other reactive organic materials.

Another group of suitable polyepoxides is obtained from novolacs or similar polyphenol resins.

Polyglycidyl ethers of polyhydric alcohols are also suitable. Examples of such polyhydric alcohols which may be mentioned are ethylene glycol, diethylene glycol, triethylene glycol, 1,2-propylene glycol, 1,4-propylene glycol, pentane-1,5-diol, hexane-1,2,6-triol, glycerol and bis-(4-hydroxycyclohexyl)-2,2-propane. Polyglycidyl esters of polycarboxylic acids can also be used and are obtained by reacting epichlorohydrin or similar epoxide compounds with an aliphatic or aromatic polycarboxylic acid, such as oxalic acid, succinic acid, glutaric acid, terephthalic acid, 2,6-naphthalenedicarboxylic acid and dimerized linoleic acid. Glycidyl adipate and glycidyl phthalate are examples.

Copolymers formed from a reaction of unsaturated compounds which contain an epoxide group, for example glycidyl methacrylate, glycidyl acrylate, N-glycidylacrylamide, allyl glycidyl ether and N-glycidylmethacrylamide, with another unsaturated monomer which can be copolymerized with the former are also suitable.

A reaction product is formed on reacting materials which contain epoxide groups with an amine. The amine used can be primary or secondary, secondary amines being particularly highly suitable.

Examples of such amines are monoalkylamines and dialkylamines, such as methylamine, ethylamine, propylamine, butylamine, dibutylamine, dimethylamine, diethylamine, dipropylamine, diisopropylamine, methylbutylamine, dibutylamine, diethanolamine, diamylamine, diisopropanolamine, ethylaminoethanol, ethylaminoisopropanol, ethanolamine, ethylenediamine, diethylenetriamine, methylcyclohexylamine and dicyclohexylamine.

Low-molecular amines are used in most cases, but it is also possible to employ high-molecular monoamines, in particular when it is intended to increase the flexibility of the resin by incorporating such amines. Similarly, mixtures of lower-molecular and higher-molecular amines can also be used for modifying the properties of the resin.

The amines can also contain other groups, but these must not interfere with the reaction of the amine with the epoxide group and must also not lead to a gelling of the reaction mixture.

The reaction of the amine with the compound which contains epoxide groups frequently occurs even during mixing of these materials. However, heating the reaction mixture at moderately elevated temperatures may be desirable, for example at 50° to 150° C., but reactions can also be carried out at lower and higher temperatures. To terminate a reaction it is frequently advantageous to increase the temperature, at least a little, towards the end of the reaction for a sufficient period to ensure complete conversion.

An amount of amine which is sufficiently large to ensure that, after the resin has been protonated by the addition of an acid, it takes on a sufficiently cationic character to permit the dilution with water should be used for the reaction with the compound containing epoxide groups. Essentially all epoxide groups of the resin can be reacted with an amine. However, it is also possible to leave excess epoxide groups in the resin, which hydrolyze with the formation of hydroxyl groups on contact with water.

The whole structure of the cationic synthetic resin which contains amino groups makes it possible to ensure that, after it has been protonated with acids as a carrier resin, finely dividided ionic plastics can be dispersed in it in such a way that stable aqueous dispersions are produced, even at a pH value of over 7, from which the cathodic deposition of the coatings can be carried out at these pH values of between 7 and 9.

The resins which contain epoxide groups can also be reacted with Mannich bases which are free from epoxide groups, instead of with the amines, in order to form the cationic synthetic resins. This reaction is known and has been described in the West German Published patent applications Nos. 2,419,179, 2,320,301, 2,357,075, 2,541,801, 2,554,080 and 2,751,499.

Those epoxide-free Mannich bases which are preferentially suitable are those obtained by reacting the components (a₁) condensed phenols which are free from ether groups and contain at least two aromatic rings and at least two phenolic hydroxyl groups, and/or (a₂) condensed phenols which contain ether groups and at least two aromatic rings and at least one phenolic hydroxyl group, (a₃) secondary amines having at least one hydroxyalkyl group, if appropriate mixed with (a₄) secondary dialkylamines or dialkoxyalkylamines which do not contain free hydroxyl groups, and (a₅) formaldehyde or compounds which split off formaldehyde.

The following may be said about the individual components:

Condensed phenols which are free from ether groups and contain at least two aromatic rings and at least two phenolic hydroxyl groups, which are particularly suitable as component (a₁), are condensed phenols of the general formula

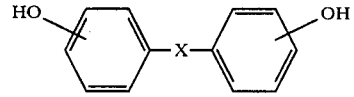

wherein the hydroxyl groups are in the ortho-position or para-position in relation to X, and X is a straight-chain or branched, divalent aliphatic readical having 1 to 3 carbon atoms, or SO₂, SO or

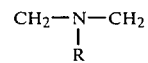

(in which R denotes an alkyl radical having 1 to 6 C atoms); bisphenol A is particularly suitable. Low-molecular reaction products formed from phenols and formaldehyde, so-called novolacs, can also be employed.

If appropriate, it is possible to use, as a mixture with the condensed phenols ($a_1$) or instead of the latter, further condensed phenols ($a_2$) which contain at least one phenolic hydroxyl group and, in addition, also one or more ether groups in the molecule. These products have the general formula

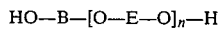

or

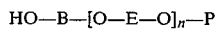

wherein B represents the radical

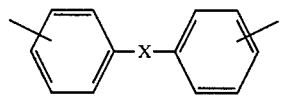

and X has the meaning indicated above, E represents a radical which contains hydroxyl groups and has been obtained by adding an epoxide compound onto a phenolic hydroxyl group, P represents a phenyl or alkylphenyl radical and n represents an integer from 1 to 3, and wherein epoxide resins, such as, for example, diglycidyl ethers of bisphenol A, pentaerythritol, glycerol, trimethylolpropane, glycol, glycol ethers and other polyhydric, preferably dihydric to tetrahydric alcohols, are preferably employed as the epoxide compounds (for E).

If the condensed phenols ($a_2$) are to be used on their own, it is advantageous to select those based on triglycidyl or tetraglycidyl ethers.

Other suitable compounds containing epoxide groups are nitrogen-containing diepoxides, such as are described in U.S. Pat. No. 3,365,471, epoxide resins obtained from 1,1-methylene-bis-(5-substituted hydantoin) in accordance with U.S. Pat. No. 3,391,097, diepoxides obtained from bisimides in accordance with U.S. Pat. No. 3,450,711, epoxylated aminomethyldiphenyl oxides according to U.S. Pat. No. 3,312,664, heterocyclic N,N'-diglycidyl compounds according to U.S. Pat. No. 3,503,979, aminoepoxy phosphates according to British Pat. No. 1,172,916 or 1,3,5-triglycidyl isocyanurates.

Components ($a_2$) which are particularly preferred are the products formed from the reaction of diglycidyl ethers of bisphenol A or of polyhydric aliphatic alcohols, such as pentaerythritol, trimethylolpropane and glycerol, with bisphenol A and, if appropriate, phenol, which contain phenol groups and are virtually free from epoxide groups. Such products generally have molecular weights from 650 to 1,300 and epoxide values from 0.004 to 0.01 and can be prepared, for example, at temperatures between 160° and 180° C., or at correspondingly lower temperatures in the presence of catalysts for the reaction.

The condensed phenols ($a_2$) contain aliphatically bonded hydroxyl groups. Some of these are formed from the epoxide groups of the epoxide resins (E) in the reaction of the latter with the bisphenols (B) or with the phenols (P). However, hydroxyl groups can also be present already in the epoxide resins themselves, if the latter have been prepared by reacting alcohols of a functionality higher than dihydric (for example pentaerythritol, trimethylolpropane or glycerol) with 2 moles of epichlorohydrin.

In the case which is in itself preferred, in which mixtures of the components ($a_1$) and ($a_2$) are employed, the ratio by weight of the two components is between 1:0.1 and 1:5.

Examples of suitable secondary amines ($a_3$) which contain at least one hydroxyalkyl group are alkylethanolamines or alkylisopropanolamines having 1 to 6 carbon atoms in the alkyl group. Dialkanolamines of alcohols having 2 to 6 carbon atoms, in particular diethanolamine, and also mixtures of these dialkanolamines with alkylalkanolamines are preferred, however.

The secondary amines ($a_3$) which are incorporated in the Mannich bases as dialkanolaminomethyl groups and alkylalkanolaminomethyl groups are of considerable importance for the degree of dispersibility of the binders in the desired pH range of 6.0 to 10.2 and for the crosslinking of the system.

Suitable secondary dialkylamines or dialkoxyalkylamines ($a_4$), which are employed conjointly with the amine ($a_3$) containing hydroxyalkyl groups in the preparation of the Mannich bases, are those of the general formula

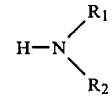

in which $R_1$ and $R_2$ are identical or different and represent a straight-chain or branched aliphatic radical which has 2 to 10 carbon atoms and may contain alkoxy groups. Examples of suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, such as, for example, di-2-methoxyethylamine, di-2-ethoxyethylamine or di-2-butoxyethylamine, and also secondary amines in which $R_1$ and $R_2$ are linked to form a ring, such as, for example morpholine or piperidine.

Di-n-butylamine, di-2-ethylhexylamine and di-n-hexylamine are preferentially suitable. The mode of action of these secondary amines ($a_4$) consists chiefly in influencing the stability properties of the binders, and in addition they contribute to the leveling and to the "internal plasticization" of the lacquer films produced from the binders. They also make a certain contribution to the crosslinking.

As a result of their mode of preparation, the secondary amines can also contain, inter alia, corresponding primary amines, but their content of these should not exceed 20 percent by weight of the secondary amine. The ratio by weight of the components ($a_3$) and ($a_4$) can be between 1:10 and 1:0.1, preferably between 1:2 and 2:1.

Aqueous or alcoholic, such as, for example, butanolic, solutions of formaldehyde or paraformaldehyde or mixtures thereof are used as formaldehyde or compounds which provide formaldehyde ($a_5$).

The Mannich bases are prepared by the customary methods indicated in the literature (see, for example, Houben-Weyl, Methoden der organischen Chemie (Methods of Organic Chemistry), volume XI/1, page 731 (1957)), preferably by carrying out the reaction at temperatures between 20° and 80° C. The proportions of the starting materials employed depend on the particular properties desired, the molar ratio of the components ($a_1$) and ($a_2$) to the components ($a_3$) and ($a_4$) being preferably 1:0.75 to 1:3. In general, however, about one mole of secondary amine is employed for each phenolic hydroxyl group. The quantity of ($a_5$) is at least one mole, relative to one mole of secondary amine.

The Mannich bases which are free from epoxide groups are reacted in a quantity of 50 to 90, preferably 60 to 80, percent by weight, with 5 to 50, preferably 10 to 30, percent by weight of the epoxide resin. The reaction of the components is carried out in general at temperatures of 20° to 100° C., preferably 60° to 80° C., if appropriate in the presence of organic solvents, such as, for example, alcohols, glycol ethers and ketones. The reaction product obtained is substantially free from epoxide groups.

Some of the aliphatically bonded hydroxyl groups of the component A can, if appropriate, be converted into urethane groups. In the reaction of the hydroxyl groups with partially blocked polyisocyanates, resins free from epoxide groups are used preferably. If epoxide resins based on polyhydric aliphatic alcohols, for example pentaerythritol, are used, the attack of the isocyanate takes place preferentially at the free primary alcohol group; there is only a secondary reaction at the secondary alcohol group which has been formed from the epoxide ring.

Any amino or imino groups which may be present can also react with the partially blocked polyisocyanates, which can be desirable in many cases.

The reaction is usually carried out at temperatures from 50° to 120° C., preferably from 70° to 100° C., and conventional catalysts for the formation of polyurethanes, such as, for example, dibutyltin dilaurate, can be present. The reaction is carried out in the absence of polar solvents; it is preferable to carry out the reaction in the melt, but inert diluents can also be present.

Aromatic diisocyanates, such as toluylene diisocyanates or xylylene diisocyanates or dimers and trimers thereof, are particularly suitable as partially blocked polyisocyanates. However, it is also possible to use aliphatic diisocyanates, such as hexamethylene diisocyanate, and also the prepolymers which are prepared by reacting polyols or polyether polyols with an excess of polyisocyanates. Preferential blocking agents are aliphatic alcohols, which can have a straight-chain, branched or cyclic structure, such as, for example, methanol, ethanol, n-, iso- or tert.-butanol, hexanol, ethylhexanol, furfuryl alcohol, cyclohexanol, alkylglycols, alkyldiglycols and alkyltriglycols. Other known blocking agents such as oximes, lactams, ketones or malonic esters can, however, also be used.

It is possible, without difficulty, to modify only a fraction of the Mannich bases or of the epoxide resins with polyisocyanates, whether this is because epoxide compounds containing or not containing aliphatic hydroxyl groups are present alongside one another or whether further, unmodified epoxide compounds are added after the reaction with a polyisocyanate has been carried out.

The proportions in the reactions with the partially blocked polyisocyanates are preferably so chosen that there is 0.01 to 1.0, preferably 0.05 to 0.5, mole of urethane groups to one mole of basic nitrogen in the finished reaction product, counting both the urethane bond between reaction product and polyisocyanate and the urethane bond between blocking agent and polyisocyanate.

The whole structure of the reaction product makes it possible to ensure that, after it has been protonated with acids as a carrier resin, finely divided, ionic plastics can be dispersed in it in such a way that stable, aqueous dispersions are formed, from which the cathodic deposition of the coatings can be carried out. In its protonated form the carrier resin can be diluted with water. If required, it is possible for additional solvents in amounts up to 5%, relative to the solid carrier resin, also to be present, such as, for example, alcohols, such as isopropanol, propanol, butanol, glycols or glycol ethers, such as ethylene glycol, propylene glycol, ethylene glycol monoethyl ether, ethylene glycol monopropyl ether or ethylene glycol monobutyl ether, or other solvents, such as tetrahydrofuran, aliphatic and/or aromatic hydrocarbons, esters, ethers or ether-esters, in order to affect advantageously the dissolving properties and dispersing properties of the carrier resin.

It is an important characteristic of the invention that the aqueous dispersion contains finely divided ionic plastics dispersed in it as the component B.

These plastic powders are solid and easy to grind at room temperature up to temperatures of 100° C. They are not reactive in the sense of undergoing film formation to give high-molecular materials at temperatures as low as room temperature on their own or together with other compatible resins, such as the cationic carrier resin. However, under the conventional stoving conditions, which are between 140° C. and 220° C., preferably above 160° C., they melt and combine with the cationic carrier resin on the coated substrate to form a compatible film.

In respect of chemical structure, the same synthetic resins can be used for the component B as can be used for the component A, with the proviso that when used as the ionic plastics of the component B they must be provided at room temperature in a solid and finely divided form. As a rule, this is the case when they have a glass transition temperature of 30°–150° C., preferably of 40°–130° C.

Plastic powders which are preferentially suitable for use as the component B belong to the group comprising epoxide resins, polyester resins, acrylate resins, polyurethane resins and polyamide resins. They contain ammonium, sulfonium or phosphonium groupings as ionic groups. Those finely divided plastics which contain ammonium structures are particularly advantageous.

They are prepared by known methods, for example by reacting epoxide resins or modified epoxide resins with primary or secondary amines and subsequently neutralizing the amino groups with acids. The resins which contain epoxide groups and were listed initially for the component A are suitable as the epoxide resins or modified epoxide resins.

Those finely divided plastics which are obtained by reacting resins which contain epoxide groups with tertiary ammonium salts to give quaternary ammonium compounds are also suitable as component B. They are likewise known and have been described, for example, in West German published application No. 2,531,960.

Pulverulent, finely divided acrylate resins having basic nitrogen groups are also suitable as component B. Such acrylate resins are produced, for example, by using, for example, dimethylaminoethyl acrylate, diethylaminoethyl acrylate, dimethylaminopropyl acrylate, diethylaminopropyl acrylate or the corresponding methacrylates as comonomers in the polymerization and subsequently neutralizing with acids the copolymer obtained.

Ionic polyurethane powders, which are prepared by using as a polyol component, for example triethanolamine or tripropanolamine, are also suitable as component B.

All the powders of this type can be employed in the aqueous dispersion as component B, provided that they are compatible with the carrier resin. Incompatibility can readily be recognized by the fact that the coating system separates into two layers when stoved.

The ionic plastic powder can be dispersed in this form in the aqueous dispersion. However, it is also possible to use a plastic powder containing fillers. In this case, the pigments and/or fillers have already been incorporated during the preparation of the ionic plastic powder. The aqueous dispersion itself can then be free from pigments.

The aqueous dispersion according to the invention is not limited merely to containing a single ionic resin. Mixtures of two or more different plastic powders can also be present. In this case, one or other plastic powder can contain pigments and/or fillers, but the other plastic powder can be free from these additives. The plastic powders employed can also contain, in addition to pigments and fillers, small quantities of hardening agents and other additives which regulate the flow behavior of the powder during stoving. The action of these additives incorporated into the plastic powder cannot be adversely affected by the aqueous dispersion.

As is customary in other coating agents, the aqueous dispersion can similarly contain auxiliaries which can be deposited by electrophoresis, such as, for example, pigments, fillers, hardening catalysts, agents for improving flow, anti-foaming agents and agents for improving adhesion. In many cases it is advantageous for the process according to the invention if the aqueous dispersion also has an additional content of crosslinking agents, with which the components A and B react by crosslinking at stoving temperatures. Examples of possible crosslinking agents are aminoplast resins, such as, for example, melamine-formaldehyde resins or urea-formaldehyde resins, phenoplast resins or fully blocked isocyanates.

The ratio between the components A and B is important when using the aqueous dispersion for the production of stoved coatings on the surface of electrically conductive substrates, connected as the cathode, by cathodic deposition from a coating bath in a cathodic electrocoating lacquering process, and the average particle size of the component B is also important for the quality of the coating deposited.

The best results are obtained in the cathodic deposition if there are 0.1 to 100 parts by weight of the component B, preferably 0.5 to 10 parts by weight of the component B, to 1 part by weight of the component A, relative to the pigment-free and filler-free powder.

The aqueous dispersion contains, in addition to the component A and the component B, also 0 to 10 parts by weight of pigments and/or fillers, preferably 2 to 5 parts by weight.

The particle size of the component B is an important factor. It should have a particle size distribution in which at least 95% of the particles are smaller than 30 $\mu$m. The best results are obtained and hence those plastic powders are preferred in which at least 95% of the particles are smaller than 10 $\mu$m. The particles of the plastic powder are more readily coated by the carrier resin as their size decreases. For this reason the cathodic deposition of finer particle sizes is simpler and more even.

The aqueous dispersion is prepared by the methods which are known in the paint industry. Thus, the plastic powder can be stirred directly into the aqueous solution or dispersion of the protonated carrier resin by means of a high-speed dispersing apparatus. Another possibility lies in jointly incorporating the plastic powder, together with the desired pigments and/or fillers, into the aqueous solution of the protonated carrier resin in a ball mill or stirred ball mill.

A further possible means of preparing the aqueous dispersion is mixing an aqueous suspension of a plastic powder directly into the aqueous solution of the carrier resin. This method dispenses with the expensive grinding process by means of a sand mill or a stirred ball mill.

In order to facilitate the preparation of the aqueous dispersion, it is possible to effect the incorporation of the solid component in the presence of small quantities of emulsifiers. Examples of suitable emulsifiers are non-ionic emulsifiers of the type of ethlene oxide adducts of varying chain lengths, such as, for example, alkylphenols modified with ethylene oxide, for example tertiary octylphenol which has been modified with 5 to 40 ethylene oxide units, and also higher aliphatic alcohols modified with ethylene oxide, such as, for example, lauryl alcohols having 15 to 50 ethylene oxide units, and also similarly modified long-chain mercaptans, amines or fatty acids. Preferred mixtures have at least two ethylene oxide adducts in which the ethylene oxide units have different values. The bath stability and the properties of the coating are not substantially affected by the additives.

Cationic emulsifiers, such as, for example, low-molecular amino compounds which contain OH groups and which have been protonated with organic or inorganic acids, are also suitable. The quantities of emulsifiers should not exceed 2 parts by weight, relative to the quantity of carrier resin.

The aqueous dispersion according to the invention is preferentially suitable for a cataphoretic deposition of a coating on an electrically conductive substrate which is connected as the cathode in an electrocoating lacquering process. For carrying out the cathodic deposition, the aqueous dispersion is diluted with water down to a solids content between 5 and 30%, preferably between 5 and 15%. The pH value is between 1 and 9, but preferably between 5 and 9. During the cathodic deposition, the dispersion is kept at temperatures between 15° and 40° C. The substrate to be coated is immersed in the dispersion and connected as the cathode. The anode used is graphite or a noble metal. A direct current is passed through the bath between the cathode and the anode. The deposition voltage is 20 to 500 volts. Under these conditions a coating is deposited on the cathode. Deposition is carried out until the desired film thickness has been achieved.

It is a particular advantage that film thicknesses of 150 $\mu$m are obtained on the coated substrate even after a brief period. Depending on the plastic powder chosen, periods as low as 10 seconds are adequate in some cases to obtain these film thicknesses. After the substrate has been removed from the coating bath, the coating is rinsed with water and stoved for 15 to 60 minutes at temperatures between 140° C. and 220° C. In some cases it is advantageous to interpose a brief preliminary drying stage at 100° C. before stoving.

It has been found, surprisingly, that the powder resin is deposited on the cathode together with the carrier resin. This could not have been expected, since dispersions of finely divided powder resin cannot be deposited by electrophoresis.

Since the electrocoating bath becomes depleted in both the carrier resin and the plastic powder during the deposition process, it is necessary to replenish the bath with these substances, so that the original composition of the aqueous dispersion is always maintained.

The properties of the stoved coating are excellent from a technological point of view. The corrosion resistance is surprisingly good and varies wth the nature of the solid powder lacquers. Using the aqueous dispersion according to the invention a very high film thickness is achieved, which, of course, somewhat impairs the throwing power. The stoved film can be subjected without difficulty to further lacquering using conventional lacquers.

The Examples which follow are intended to illustrate the essence of the invention, but not to limit it. Percentages relate to percentages by weight; parts relate to parts by weight.

EXAMPLE 1

(Preparation of a component A)

960 g of an epoxide resin, which is based on bisphenol A and has an epoxide equivalent weight of 480, and 167 g of xylene are weighed into a reaction flask, which is equipped with a stirrer, a thermometer, an inlet for nitrogen and a reflux condenser. This mixture is heated to 100° C. and 570 g of a 70% strength solution of a diketimine from the reaction of diethylenetriamine with methyl isobutyl ketone in methyl isobutyl ketone and 36.5 g of diethylamine are then added under a nitrogen atmosphere. The mixture is stirred for 1 hour at 110° to 120° C. and then cooled. A cationic synthetic resin is produced which contains amino groups and has a solids content of 80%. Its viscosity, measured as a 50% strength solution in xylene, is 355 mPas.

EXAMPLE 2

(Preparation of a component A)

960 g of an epoxide resin based on bisphenol A (epoxide equivalent weight of 480) and 220 g of xylene are weighed into a reaction flask equipped with a stirrer, a thermometer, an inlet for nitrogen and a reflux condenser. This mixture is heated to 100° C. and 146 g of diethylamine are added under a nitrogen atmosphere. The mixture is stirred for 1 hour at 110° C. to 120° C. and thereafter cooled. A resin solution of 80% solids content is obtained. The viscosity, measured as a 50% strength solution in butylglycol, is 35 mPas.

EXAMPLE 3

(Preparation of a component B)

1,000 g of an epoxide resin, which is based on bisphenol A and has an epoxide equivalent weight of 850 (Epikote 1055), is melted at 130° C. in a reaction vessel equipped with a stirrer, a thermometer, an inlet for nitrogen, a reflux condenser and a feed funnel. 105 g of diethanolamine are added via the feed funnel at 120°–130° C. and allowed to react for one hour. 60 g of glacial acetic acid are then added, the reaction is continued for 30 minutes at 120°–130° C. and the batch is then discharged. A solid product is obtained.

Melting point: 74° C.
Milliequivalents of acid: 0.359 milliequivalent/g
Milliequivalents of base: 0.489 milliequivalent/g
Viscosity: 910 mPas (50% strength solution in ethylglycol)

The solid product is pre-ground. A powder of a particle size of $20\mu$ is then prepared by fine grinding and sieving.

EXAMPLE 4

(Preparation of a component B)

Under the reaction conditions of Example 3, 850 g of the epoxide resin in accordance with Example 3 is reacted with 149 g of a reaction product of 89 g of dimethylethanolamine with 60 g of acetic acid. A solid product is obtained.

Melting point: 103° C.
Milliequivalents of acid: 0.25 milliequivalent/g
Milliequivalents of base: 0.403 milliequivalent/g
Viscosity: 970 mPas A powder is prepared by using the procedure described in Example 3.

EXAMPLE 5

(Preparation of a component B)

100 g of a powder of the resin composition in accordance with Example 4 (particle size $500\mu$), 3 g of a leveling agent, 20 g of titanium dioxide (rutile grade), 8 g of aluminum silicate and 2 g of red iron oxide are melted and kneaded together in a kneader in the manner customary for the preparation of pulverulent coating agents. After solidifying, the mixture is pre-ground and thereafter ground in a spiral jet mill to give a powder with a maximum particle size of $30\mu$ and an average particle size of $10$–$15\mu$.

EXAMPLE 6

(Preparation of a component B)

1,500 g of ethyl acetate are weighed into a reaction flask in accordance with Example 3 and heated, under a nitrogen atmosphere, to the reflux temperature. A mixture of 300 g of styrene, 450 g of methyl methacrylate, 450 g of butyl acrylate, 300 g of glycidyl methacrylate and 30 g of azoisobutyrodinitrile is then added in the course of 3 hours. The polymerization is continued for 2 hours under reflux after the end of the addition. 188 g of methylethanolamine are then added via a tap funnel and reacted for 1 hour under reflux. 126.7 g of acetic acid are then added. After a further 30 minutes of reaction period at 70° C., the ethyl acetate is distilled off in vacuo. The solid product (melting point 84° C.) obtained is then processed into a fine-grained powder as in Example 3.

EXAMPLE 7

5.5 parts of glacial acetic acid are added to 100 parts of the carrier resin prepared according to Example 1. This mixture is dispersed with stirring in 520 parts of distilled water. 50 parts of the powder obtained in accordance with Example 3 are then stirred into this dispersion. The dispersion thus prepared has a solids content of 20% and a pH value of 8.3. A phosphatized sheet of steel is immersed in this dispersion and connected as the cathode. An immersed sheet of stainless steel is connected as the anode. A coating was deposited on the cathode sheet for 30 seconds on applying a direct current at a voltage of 200 volts and a bath temperature of 20° C. The sheet which had been provided with the coating was taken out, rinsed with fully demineralized water and thereafter stoved for 20 minutes at 180° C. A hard, even, continuous film with an average film thickness of 36 μm is formed on the side of the sheet facing the anode.

EXAMPLE 8

35.7 parts of a 70% strength solution of a product from the reaction of 174 g of toluylene diisocyanate, 130 g of 3-ethylhexanol and 44.7 g of trimethylolpropane, 0.5 part of dibutyltin dilaurate and 5.5 parts of glacial acetic acid are added to 100 parts of the carrier resin prepared in accordance with Example 1. This mixture is dispersed with stirring in 706 parts of distilled water. 50 parts of the powder obtained in accordance with Example 3 are stirred into this dispersion. The dispersion obtained has a solids content of 18%. After an aging period of 24 hours, it is deposited in accordance with Example 7. A hard, even, continuous film of 34 μm thickness is obtained.

The film is resistant towards methyl isobutyl ketone, and in the corrosion resistance test as specified in German Industrial Standard DIN 50,021 it was still in a satisfactory condition after 1,000 hours.

EXAMPLE 9

A coating agent is prepared in accordance with Example 8. The phosphatized sheet of steel which is to be coated is bent at an angle of 90° so that an L-shaped workpiece is produced which has vertical and horizontal areas.

After depositing and stoving in accordance with Example 8, the film thickness is measured. On the horizontal part it is 33 μm and on the vertical part it is 32 μm. The appearance of the coating was uniform and smooth.

The trial is repeated after the bath has aged for 14 days. Film thicknesses of 31 μm on the horizontal and 30 μm on the vertical area were found.

This result shows that the compositions described have a very good stability.

We claim:

1. In an aqueous dispersion comprising a cationic coating agent together with a pulverulent, synthetic resin for coating an electrically conductive substrate connected as a cathode in an electrocoating process and subsequently hardening the coating, the improvement comprising said aqueous dispersion consisting essentially of a mixture of:

(A) said cationic coating agent comprising water-dispersed or water-soluble cationic synthetic resins containing basic groups prepared by reacting resins containing epoxide groups and bases selected from the group consisting of organic amines and Mannich bases followed by protonation with acids to form a carrier resin; and
(B) said pulverulent, synthetic resin comprising dispersed, finely-divided, solid, ionic, plastic powders selected from the group consisting of epoxide resins, polyester resins, acrylate resins, polyurethane resins and polyamide resins having ionic groups selected from the group consisting of ammonium, sulfonium, and phosphonium ions.

2. The aqueous dispersion of claim 1, wherein component A is the reaction product of polyepoxide compounds having 2 to 3 epoxide groups per molecule with primary or secondary amines and protonated with carboxylic acids and component B has a particle size distribution in which at least 95% of the particles are smaller than 30 μm and said ionic plastic powders are second synthetic resins containing basic groups and the weight ratio of B to A is 0.1 to 100/1.

3. The aqueous dispersion of claim 1, wherein component A is the reaction product of polyepoxide compounds having 2 to 3 epoxide groups per molecule with Mannich bases and protonated with carboxylic acids and component B has a particle size distribution in which at least 95% of the particles are smaller than 30 μm and said ionic plastic powders are second synthetic resins containing basic groups and the weight ratio of B to A is 0.1 to 100/1.

4. The aqueous dispersion of claim 1, wherein said aqueous dispersion has a solids content of 5 to 30%.

5. The aqueous dispersion of claim 1, wherein said hardening is carried out at a temperature between 140° C. and 220° C. by stoving and components A and B combine to form a compatible film having a thickness of about 150 μm.

6. The aqueous dispersion of claim 2, wherein component B has a glass transition temperature of 30° to 150° C.

7. The aqueous dispersion of claim 3, wherein component B has a glass transition temperature of 30° to 150° C.

8. The aqueous dispersion of claim 1, wherein said aqueous dispersion contains pigments.

9. The aqueous dispersion of claim 8, wherein said aqueous dispersion contains fillers.

10. An aqueous dispersion as claimed in claim 1, wherein said aqueous dispersion contains additional cross-linking agents in the form of melamine resins, blocked polyisocyanates, or phenolic resins.

* * * * *